United States Patent
Reece, III

(10) Patent No.: US 9,273,991 B1
(45) Date of Patent: Mar. 1, 2016

(54) DEVICE TO ASSIST IN CUTTING ACCURATE PORTIONS OF MEAT

(71) Applicant: David R Reece, III, Navarre, FL (US)

(72) Inventor: David R Reece, III, Navarre, FL (US)

(73) Assignee: David R. Reece, III, Aiken, SC (US)

( * ) Notice: Subject to any disclaimer, the term of this patent is extended or adjusted under 35 U.S.C. 154(b) by 0 days.

(21) Appl. No.: 14/519,384

(22) Filed: Oct. 21, 2014

(51) Int. Cl.
*A22C 21/00* (2006.01)
*G01G 23/20* (2006.01)
*A22B 5/00* (2006.01)

(52) U.S. Cl.
CPC ............ *G01G 23/206* (2013.01); *A22B 5/0029* (2013.01)

(58) Field of Classification Search
CPC ....................................................... A22C 18/00
USPC .................................. 452/149, 160, 171, 198
See application file for complete search history.

(56) References Cited

U.S. PATENT DOCUMENTS

| | | | | |
|---|---|---|---|---|
| 4,438,538 A * | 3/1984 | Larsen | ...................... | B25F 1/00 33/332 |
| 5,314,375 A * | 5/1994 | O'Brien et al. | ...... | A22B 5/0005 452/149 |
| 7,918,718 B2 * | 4/2011 | Christensen et al. | .. | A22B 5/007 452/157 |

* cited by examiner

*Primary Examiner* — Richard Price, Jr.

(57) ABSTRACT

A device to assist in cutting accurate portions of meat will measure the height of a loin of meat of known density and width while being wrapped around the loin, and will instruct the user how thick to slice a portion from the loin so that the portion weighs the desired weight.

4 Claims, 5 Drawing Sheets

| HEIGHT (cm) | 8 oz cut | 12 oz cut | HEIGHT (cm) | 8 oz cut | 12 oz cut |
|---|---|---|---|---|---|
| 7 | 2.2 | 3.5 | 10.1 | 1.6 | 2.4 |
| 7.1 | 2.2 | 3.5 | 10.2 | 1.5 | 2.4 |
| 7.2 | 2.2 | 3.4 | 10.3 | 1.5 | 2.4 |
| 7.3 | 2.2 | 3.4 | 10.4 | 1.5 | 2.4 |
| 7.4 | 2.1 | 3.3 | 10.5 | 1.5 | 2.4 |
| 7.5 | 2.1 | 3.3 | 10.6 | 1.5 | 2.3 |
| 7.6 | 2.1 | 3.2 | 10.7 | 1.5 | 2.3 |
| 7.7 | 2.0 | 3.2 | 10.8 | 1.5 | 2.3 |
| 7.8 | 2.0 | 3.2 | 10.9 | 1.4 | 2.3 |
| 7.9 | 2.0 | 3.1 | 11 | 1.4 | 2.2 |
| 8 | 2.0 | 3.1 | 11.1 | 1.4 | 2.2 |
| 8.1 | 1.9 | 3.0 | 11.2 | 1.4 | 2.2 |
| 8.2 | 1.9 | 3.0 | 11.3 | 1.4 | 2.2 |
| 8.3 | 1.9 | 3.0 | 11.4 | 1.4 | 2.2 |
| 8.4 | 1.9 | 2.9 | 11.5 | 1.4 | 2.1 |
| 8.5 | 1.8 | 2.9 | 11.6 | 1.4 | 2.1 |
| 8.6 | 1.8 | 2.9 | 11.7 | 1.3 | 2.1 |
| 8.7 | 1.8 | 2.8 | 11.8 | 1.3 | 2.1 |
| 8.8 | 1.8 | 2.8 | 11.9 | 1.3 | 2.1 |
| 8.9 | 1.8 | 2.8 | 12 | 1.3 | 2.1 |
| 9 | 1.7 | 2.7 | 12.1 | 1.3 | 2.0 |
| 9.1 | 1.7 | 2.7 | 12.2 | 1.3 | 2.0 |
| 9.2 | 1.7 | 2.7 | 12.3 | 1.3 | 2.0 |
| 9.3 | 1.7 | 2.7 | 12.4 | 1.3 | 2.0 |
| 9.4 | 1.7 | 2.6 | 12.5 | 1.3 | 2.0 |
| 9.5 | 1.7 | 2.6 | 12.6 | 1.2 | 2.0 |
| 9.6 | 1.6 | 2.6 | 12.7 | 1.2 | 1.9 |
| 9.7 | 1.6 | 2.5 | 12.8 | 1.2 | 1.9 |
| 9.8 | 1.6 | 2.5 | 12.9 | 1.2 | 1.9 |
| 9.9 | 1.6 | 2.5 | 13 | 1.2 | 1.9 |
| 10 | 1.6 | 2.5 | 13.1 | 1.2 | 1.9 |

*Fig. 3A*

| HEIGHT (cm) | 10 oz cut | 16 oz cut | HEIGHT (cm) | 10 oz cut | 16 oz cut |
| --- | --- | --- | --- | --- | --- |
| 7 | 2.9 | 4.8 | 10.1 | 2.0 | 3.3 |
| 7.1 | 2.8 | 4.7 | 10.2 | 2.0 | 3.3 |
| 7.2 | 2.8 | 4.7 | 10.3 | 2.0 | 3.3 |
| 7.3 | 2.8 | 4.6 | 10.4 | 1.9 | 3.2 |
| 7.4 | 2.7 | 4.6 | 10.5 | 1.9 | 3.2 |
| 7.5 | 2.7 | 4.5 | 10.6 | 1.9 | 3.2 |
| 7.6 | 2.7 | 4.4 | 10.7 | 1.9 | 3.1 |
| 7.7 | 2.6 | 4.4 | 10.8 | 1.9 | 3.1 |
| 7.8 | 2.6 | 4.3 | 10.9 | 1.9 | 3.1 |
| 7.9 | 2.6 | 4.3 | 11 | 1.8 | 3.1 |
| 8 | 2.5 | 4.2 | 11.1 | 1.8 | 3.0 |
| 8.1 | 2.5 | 4.2 | 11.2 | 1.8 | 3.0 |
| 8.2 | 2.5 | 4.1 | 11.3 | 1.8 | 3.0 |
| 8.3 | 2.4 | 4.1 | 11.4 | 1.8 | 3.0 |
| 8.4 | 2.4 | 4.0 | 11.5 | 1.8 | 2.9 |
| 8.5 | 2.4 | 4.0 | 11.6 | 1.7 | 2.9 |
| 8.6 | 2.4 | 3.9 | 11.7 | 1.7 | 2.9 |
| 8.7 | 2.3 | 3.9 | 11.8 | 1.7 | 2.9 |
| 8.8 | 2.3 | 3.8 | 11.9 | 1.7 | 2.8 |
| 8.9 | 2.3 | 3.8 | 12 | 1.7 | 2.8 |
| 9 | 2.2 | 3.7 | 12.1 | 1.7 | 2.8 |
| 9.1 | 2.2 | 3.7 | 12.2 | 1.7 | 2.8 |
| 9.2 | 2.2 | 3.7 | 12.3 | 1.6 | 2.7 |
| 9.3 | 2.2 | 3.6 | 12.4 | 1.6 | 2.7 |
| 9.4 | 2.2 | 3.6 | 12.5 | 1.6 | 2.7 |
| 9.5 | 2.1 | 3.5 | 12.6 | 1.6 | 2.7 |
| 9.6 | 2.1 | 3.5 | 12.7 | 1.6 | 2.7 |
| 9.7 | 2.1 | 3.5 | 12.8 | 1.6 | 2.6 |
| 9.8 | 2.1 | 3.4 | 12.9 | 1.6 | 2.6 |
| 9.9 | 2.0 | 3.4 | 13 | 1.6 | 2.6 |
| 10 | 2.0 | 3.4 | 13.1 | 1.5 | 2.6 |

Fig. 3B

DEVICE TO ASSIST IN CUTTING ACCURATE PORTIONS OF MEAT

CROSS-REFERENCE TO RELATED APPLICATIONS

This application is a non-provisional of U.S. patent application No. 61/899,347, filed Nov. 4, 2013.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

FIELD OF THE INVENTION

This invention relates to a device which measures the height of a loin of meat of known density and width to determine how thick a portion of meat needs to be when slicing the portion from the loin so that the portion weighs the desired weight.

BACKGROUND FOR THE INVENTION

Many restaurants which serve beef, pork, lamb, or veal steaks must slice individual portions of meat from a loin. The loins can vary in weight from 10 lb to 30 lb, but the loins generally have the same width and density throughout a certain type of meat. So, the restaurant will have loins that vary widely in weight, height, and length, but the restaurant has to produce portions of meat that are consistent with what the customer ordered. The variance of the loins makes it impossible for restaurants to have consistent portions or maintain cost-control.

Currently, many restaurants experience up to twenty percent waste when slicing portions of meat from a loin to serve to guests. The chef currently has to roughly estimate how thick to slice a portion of meat without using a device. This leads to error and waste if the chef slices a portion that is not thick enough, because they cannot serve a portion that weighs less than what the customer has ordered from the restaurant. The resulting waste makes it difficult for restaurants to estimate costs and profits from steaks, and steaks are often the most expensive item in a meal.

Therefore, it is believed that there is a need and a potential commercial market for an improved method with which to determine how thick to slice a portion of meat from the loin so that the portion weighs the desired weight.

BRIEF SUMMARY OF THE PRESENT INVENTION

By measuring the height of a loin of meat of known density and width, someone using the present invention will know how thick a portion needs to be when slicing the portion from the loin so that the portion weighs the desired weight. The present invention determines the thickness of the portion necessary by applying the fact that the thickness of the portion will be equal to the desired weight of the portion divided by the total product of the height of the loin, the width of the loin, and the density of the loin. The height is the only parameter that greatly varies between multiple loins, as density and loin width remain relatively constant. To determine the height of the loin, the present invention is wrapped around a loin of meat, and the perimeter of the loin is measured, but not displayed to the user. Thus, because the width is constant, and the length of the perimeter of the loin is known, the height is determined, and the thickness of the desired portion, which varies with height, is also determined and displayed to the user. So, for the present invention, there will be two ends. On one end is a printed scale, and the other end will intersect the printed scale when wrapped around a loin of meat. Where the two ends intersect determines the height, which determines the thickness of the desired portion. At the point where the two ends intersect, a number is displayed which the user how thick to cut the portion of meat from the loin so that the portion weighs the desired weight.

The fact that the thickness of the portion of a loin of meat of known density and width is dependent only on the height of the loin can be proven by knowing that density is equal to mass divided by volume. Rearranging this equation gives that volume can be determined by diving the mass by the density. The present invention assumes that the loin is a rectangular prism. For a rectangular prism, volume is equal to length multiplied by width and height. For clarity, the length dimension is referred to as thickness. So, if we know what the desired mass of a portion of meat is, and the density and width of the loin have been determined, the thickness of the portion of meat is equal to the mass of the desired portion, divided by the density, width, and height of the loin. In that equation, the height of the loin is the only unknown parameter, and the present invention determines the height of the loin by being wrapped around the loin.

DESCRIPTION OF THE DRAWINGS

FIG. 3A and FIG. 3B are alternate embodiments of the present invention which assists in cutting 8 oz and 12 oz, and 10 oz and 16 oz portions of prime rib, respectively.

DETAILED DESCRIPTION OF THE PRESENT INVENTION

Figure 1:
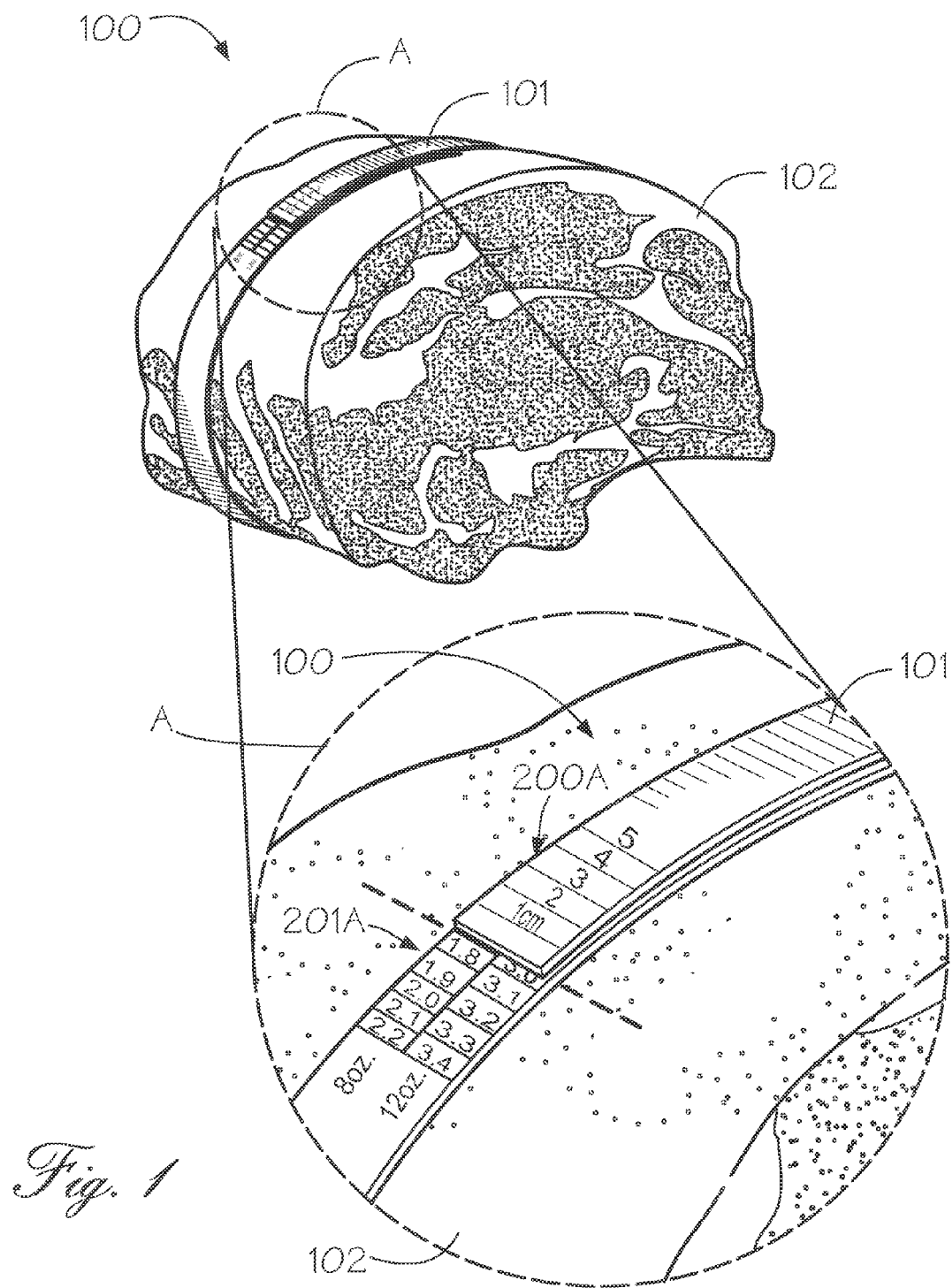
FIG. 1 is an isometric view of the present invention wrapped around a loin of meat, with an enlarged detail circle view of the two ends of the present invention intersecting.

FIG. 1 illustrates a possible embodiment of the present invention. Device 100 would be the measuring device made of washable material with a printed scale 101. The measuring device wraps around a loin of meat 102, and the end of device 100 that is the opposite end of printed scale 101 intersects the end of printed scale 101 when wrapped around a loin of meat 102, and within a region of printed scale 101 that shows the user the thickness required to slice a portion from the loin to produce a portion of the desired weight. The enlarged detail circle A illustrates the two ends of the device 100 intersecting. One end, length scale 200A, is overlapping the other end, printed scale 201A. Where the two ends intersect, on printed scale 201A, is a thickness dimension that tells the user how thick to slice the portion of meat to produce the desired weight. In FIG. 1, the intersection occurs so that the user will know to slice 3.0 cm into the loin of meat in order to produce a 12 oz steak, and to slice 1.8 cm into the loin of meat in order to produce an 8 oz steak. Length scale 200A assists the user in measuring out the 3.0 cm and 1.8 cm slices for additional accuracy.

Figure 2A:
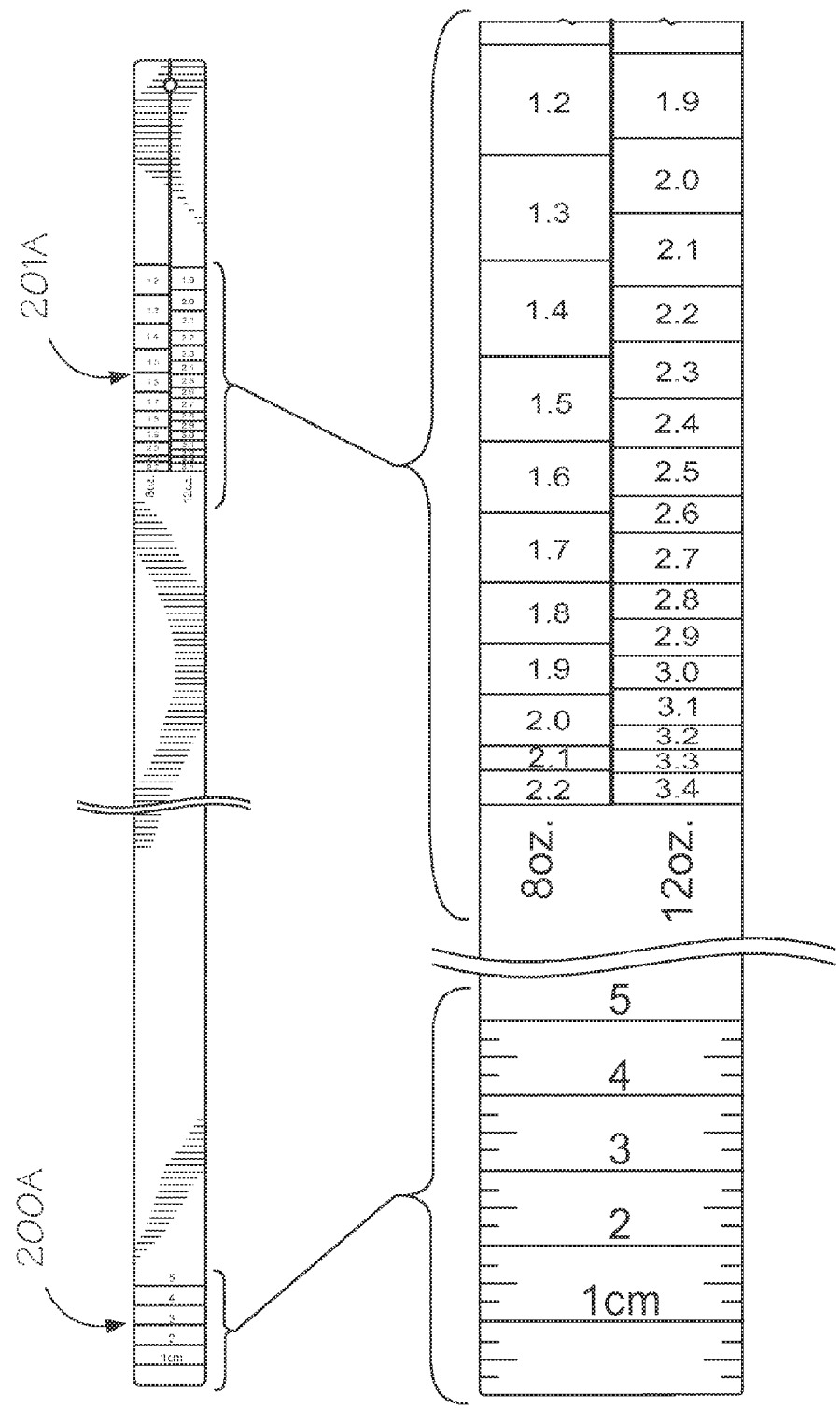
FIG. 2A and FIG. 2B are representations of the present invention which assists in cutting 8 oz and 12 oz, and 10 oz and 16 oz portions of prime rib, respectively.
Figure 2B:
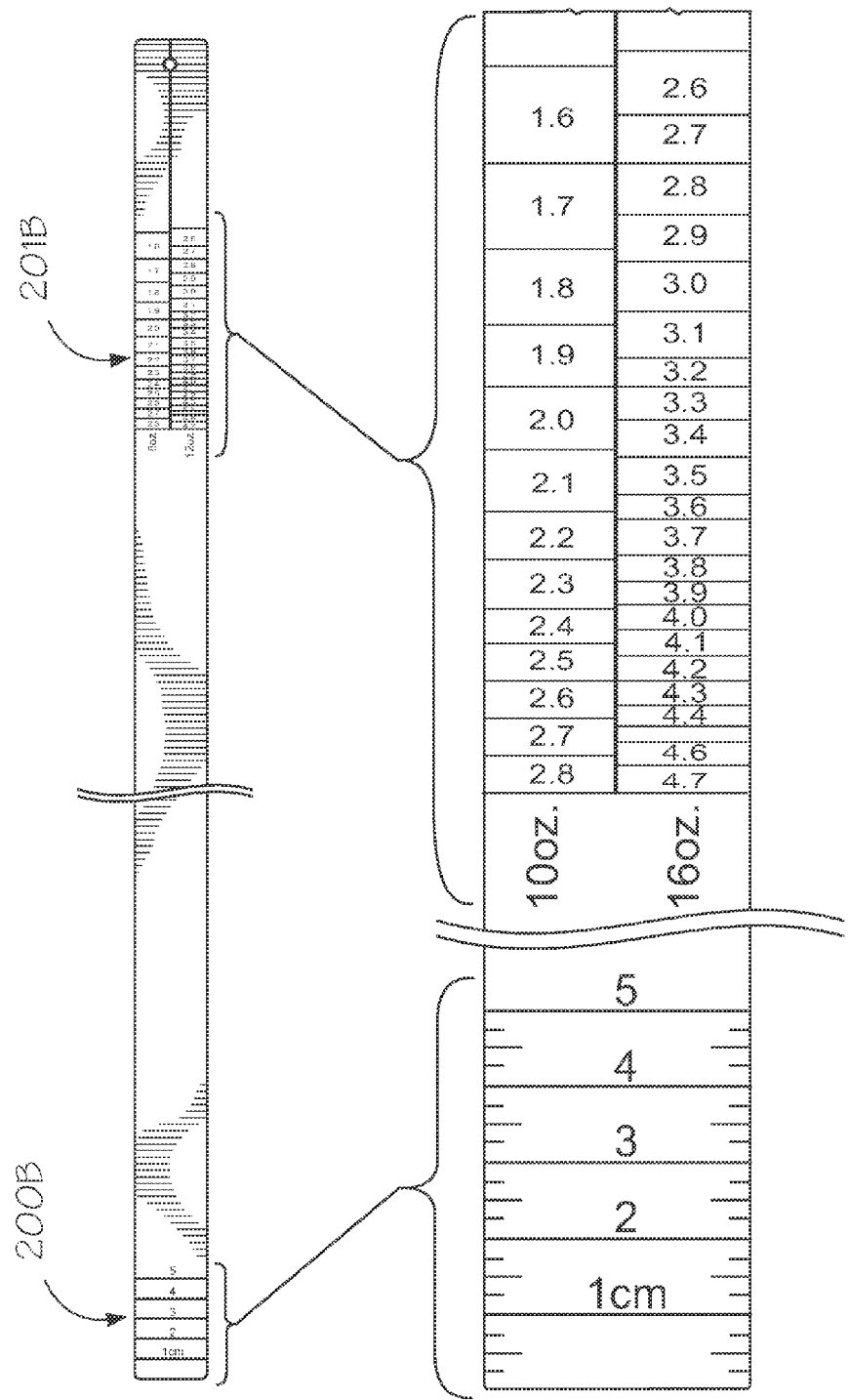

FIGS. 2A and 2B are both illustrations of the present invention. FIGS. 2A and 2B will assist the user in slicing 10 oz and 16 oz, and 8 oz and 12 oz portions of prime rib, respectively. Length scale 200A and length scale 200B are illustrations of a length dimension scale used to assist in measuring length. The required thickness dimension to slice from the loin is given by printed scale 201A and printed scale 201B. Length scale 200A and length scale 200B simply help the user measure out in length the thickness dimension given by printed scale 201A and printed scale 201B. Length scale 200A and length scale 200B are both illustrations of centimeter measuring scales, but alternate embodiments may use inches or any other length unit for the measuring scales. Printed scale 201A and printed scale 201B are illustrations of printed scales which give the thickness required to slice a portion of the desired weight. This scale contains visible lines. Between these visible lines is a thickness dimension which shows the user how thick to slice a portion from the loin so that the portion weighs the desired weight. The position of the visible lines as well as the thickness dimension visible between each two lines vary between variations of the present invention, and depend on the weight of the portion desired by the user, as well as the type of meat the loin is composed of. So, the present invention will vary for prime rib depending on whether the user desires to slice a 10 oz portion or a 16 oz portion from the loin of prime rib, and it will also vary depending on whether the user is slicing prime rib, filet mignon, rib eye, or any other type of loin.

FIG. 3A and FIG. 3B are alternate embodiments of the present invention. Using the fact that the thickness of the portion necessary will be equal to the desired weight of the portion divided by the total product of the height of the loin, the width of the loin, and the density of the loin, another embodiment of the invention would merely be a chart that requires the user to manually measure the height of the loin of meat using a measuring device, and using the measured height to find a corresponding thickness dimension on the chart necessary for a portion of the desired weight. FIGS. 3A and 3B are illustrations of the alternate embodiment which assist in cutting 8 oz and 12 oz, and 10 oz and 16 oz portions of prime rib, respectively.

What is claimed is:

1. A measuring device for determining the thickness of a cut of meat necessary to produce a desired weight of meat comprising:
    a. a flexible strap having a first end and a second end;
    b. a measuring scale printed proximate to said first end of said flexible strap;
    c. a cut-width scale printed proximate to said second end of said flexible strap;
    d. wherein, when said flexible strap is wrapped around a loin of meat said first end of said flexible strap intersects with said cut-width scale thereby indicating a meat cut width necessary to achieve a desired weight of cut meat.

2. The measuring device of claim 1 wherein said measuring scale is used to determine said meat cut width.

3. A method for determining the thickness of a cut of meat necessary to produce a desired weight of meat comprising:
    a. wrapping a flexible strap having a first end and a second end around a loin of meat, wherein said first end includes a measuring scale proximate to said first end and said second end of said flexible strap includes a cut-width scale printed proximate to said second end;
    b. determining a point of intersection between said first end of said flexible strap and said cut-width scale;
    c. reading a meat cut width from said point of intersection.

4. A method for cutting a desired weight of meat from a loin of meat comprising:
    a. wrapping a flexible strap having a first end and a second end around said loin of meat, wherein said first end includes a measuring scale proximate to said first end of said flexible strap and said second end includes a cut-width scale printed proximate to said second end of said flexible strap;
    b. determining a point of intersection between said first end of said flexible strap and said cut-width scale;
    c. reading a meat cut width from said point of intersection;
    d. cutting a thickness of said loin of meat equal to said meat cut width.

* * * * *